July 15, 1952 — C. A. GUSTAFSON — 2,603,504
ADJUSTABLE AXLE
Filed March 28, 1949 — 2 SHEETS—SHEET 1
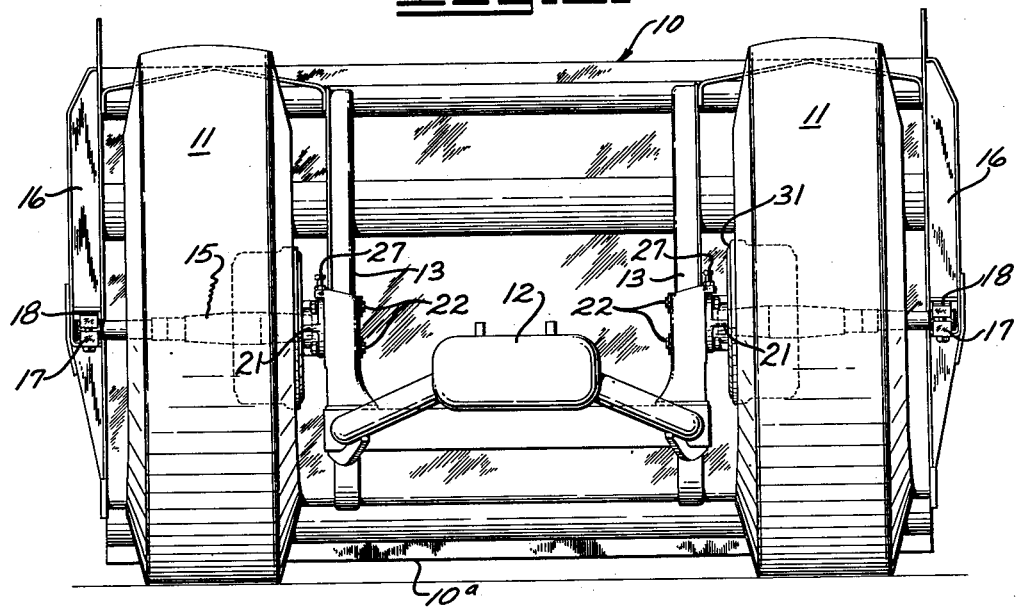
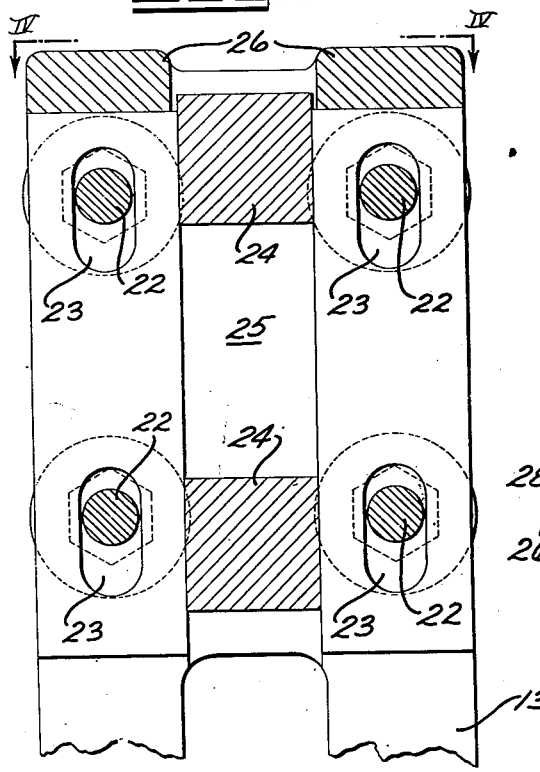
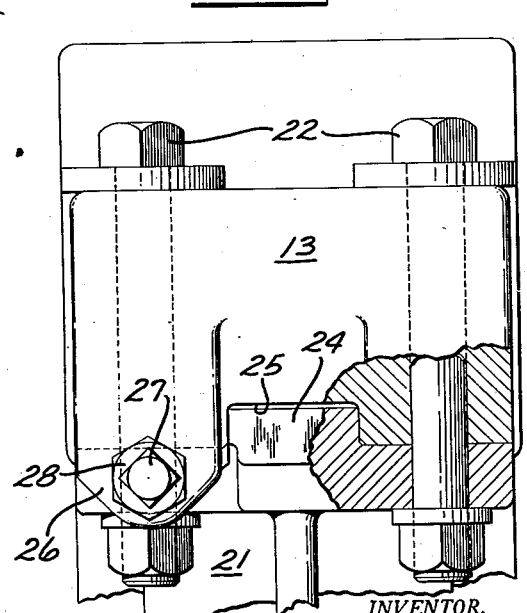
INVENTOR.
Carl A. Gustafson
BY Charles M. Fryer
ATTORNEY.

Patented July 15, 1952

2,603,504

UNITED STATES PATENT OFFICE 2,603,504

ADJUSTABLE AXLE

Carl A. Gustafson, Peoria, Ill., assignor to Caterpillar Tractor Co., Peoria, Ill., a corporation of California Application March 28, 1949, Serial No. 83,927

1 Claim. (Cl. 280—44)

This invention relates to adjustable supports for axles which carry wheels having brakes.

For purposes of illustration, this invention is disclosed in its application to axles supporting the ground engaging wheels of an earth-moving scraper. It will be apparent from the disclosure however, that the invention is not limited to the combination of equipment shown herein but is capable of general application in many fields.

A typical earth-moving scraper of the type commonly employed for collecting and moving large quantities of earth and the like usually comprises a large bowl or body member supported on ground engaging wheels and is adapted to be drawn behind a suitable draft vehicle. The bowl is provided with a scraping edge adjacent its forward portion and may be lowered to bring the scraping edge into contact with the ground to effect collection of earth therein. Such scrapers are capable of doing relatively close grading and are often used to establish the final grade in an excavating project. It is, therefore, desirable that the scraping edge be parallel with the surface of the ground thus permitting the formation of a continuous grade. In the event that the blade is not parallel to the ground, the lower edge will enter the ground first and will have a tendency to further emphasize the out of level condition due to the downward thrust of the digging portion of the blade.

It is conventional practice to provide a means of leveling the scraping edge with respect to the surface of the ground by adjusting the axle supporting the ground engaging wheels relative to the scraper bowl frame. In the past, this was accomplished by providing an eccentric mounting for the axle shaft so that upon rotation of the shaft, the wheels could either be raised or lowered with respect to the scraper bowl frame. However, when brakes are provided on the wheels, the problem of reacting the braking torque and at the same time permitting adjustment of the axle in its support makes the use of the conventional methods of adjusting the wheels relative to the scraper bowl impractical.

It is, therefore, an object of the present invention to provide improved means for adjusting an axle shaft with respect to its supporting frame. Another object of this invention is to provide a slidable means of reacting the braking torque transmitted from a wheel to the supporting frame of a wheel axle thus permitting adjustment of the axle in its supporting frame. Other objects and advantages of this invention will be made apparent in the following specification wherein reference is made to the accompanying drawings.

In the drawings:

Fig. 1 is a view in rear end elevation of an earth-moving scraper incorporating the present invention;

Fig. 3 is a fragmentary sectional view taken along the line III—III of Fig. 2; and Fig. 4 is a fragmentary elevation taken along the line IV—IV of Fig. 3.

Figure 2:
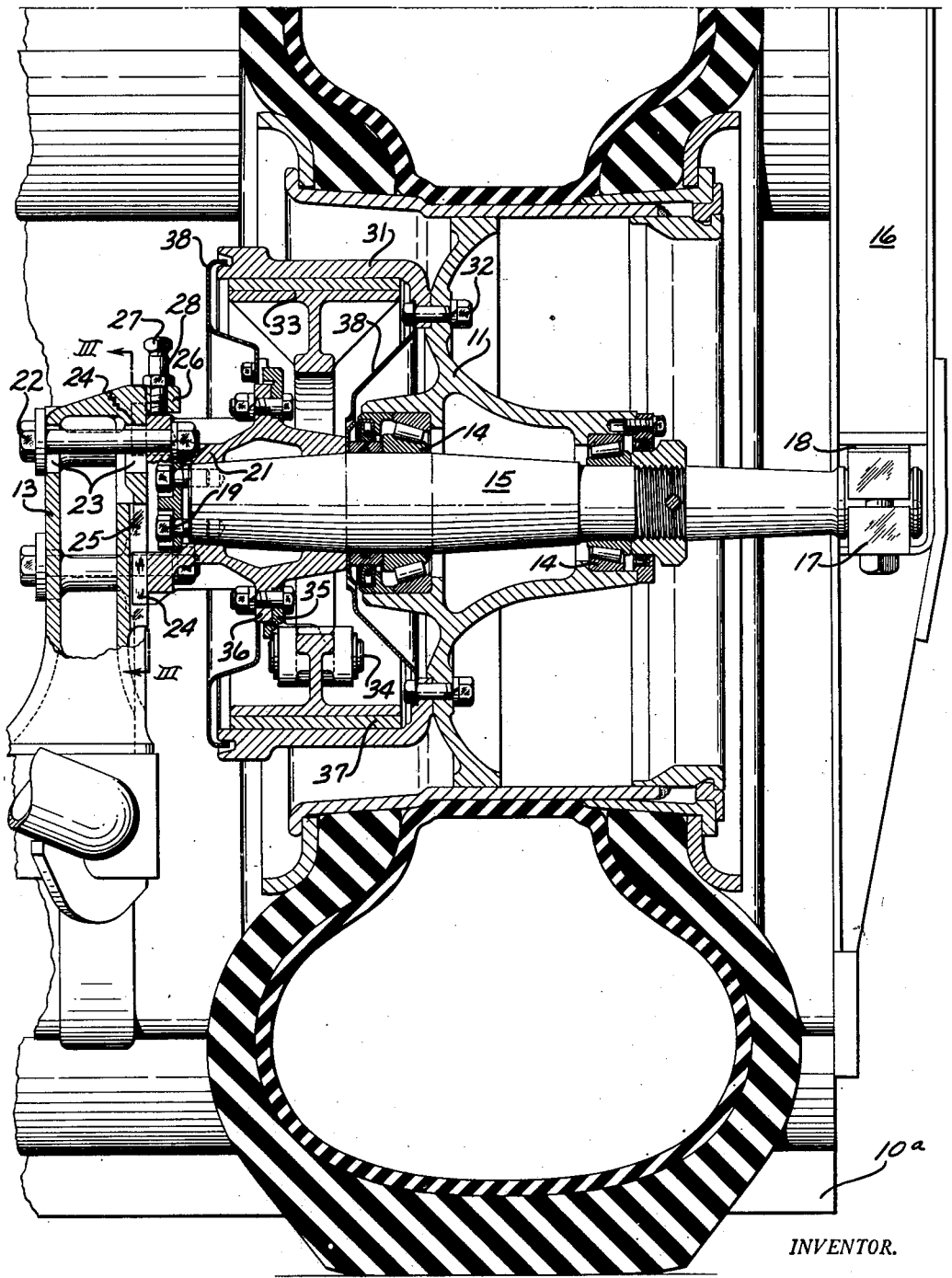
Fig. 2 is a longitudinal sectional view of a wheel and axle assembly.

Fig. 1 illustrates the rear portion of an earthmoving scraper of a type commonly employed for collecting and carrying large quantities of earth. The scraper comprises a bowl 10, carried on ground engaging wheels 11 and is adapted to be drawn behind a suitable draft vehicle in a conventional manner. The bowl may be lowered, bringing its scraping edge 10a into contact with the ground, to effect collection of earth therein and is provided with a pusher block 12 supported from a pair of spaced brackets 13 extending rearwardly from the bowl against which an auxiliary vehicle may push to facilitate loading.

As is best illustrated in Fig. 2, each of the wheels is supported for rotation on spaced bearings 14, carried on an axle shaft 15. The shaft 15 is supported at its outer end from a frame member 16 which may also form a side of the scraper bowl as illustrated and is non-rotatably secured to the frame by means of a clamp 17. The clamp is adjustable relative to the frame member 16 by means of shims indicated at 18. At its inner end, the shaft 15 is rigidly secured as by cap screws 19 to an end cap 21 which embraces the axle and is adjustably secured by means of bolts 22 to the bracket 13 extending rearwardly from the scraper bowl. Each of the bolts 22 extends through elongated slots 23 provided in the bracket 13 to permit vertical sliding movement of the end cap relative to the bracket. A pair of spaced lugs 24 extending from the end cap are received within an elongated recess 25 provided in the bracket 13 to prevent lateral sliding or twisting movement of the end cap relative to the bracket. The bracket is also provided with a pair of overhanging ears 26, each having a threaded aperture for the reception of an adjusting screw 27 adapted to engage the upper edge of the end cap 21. The adjusting screws 27 provide a means of vertically adjusting the position of the end cap relative to the bracket and each is provided with a lock nut 28 for retaining it in its adjusted position.

Each of the wheels has a brake mechanism operated from the draft vehicle by any conventional means not shown. Each brake comprises a drum 31, rigidly secured as by cap screws 32 to the wheel 11 and a pair of arcuate brake shoes, only one of which is illustrated at 33 in Fig. 2 as disposed within the drum. Each of the brake shoes is pivotally connected by means of a pin 34 to an anchor plate 35 of annular form, secured to an outwardly projecting flange 36 of end cap 21. The brake shoes are preferably lined with a suitable friction material indicated at 37 and are adapted to swing outwardly into frictional engagement with the drum 31. Dirt and other foreign material is prevented from entering the brake drum by a pair of dirt shields 38. The torque exerted during braking is transmitted through the lugs 24 on end cap 21 to the bracket 13 and thus is prevented from acting on the shaft 15. This presents an obvious advantage over structures wherein it is necessary that braking torque be reacted through an axle and at the same time it permits adjustment of the axle relative to the vehicle frame without disturbing the brake mechanism or the means through which the reaction forces are transmitted to the frame.

I claim:

In combination a vehicle having a frame, a wheel with a brake, and an axle supported by the wheel and supporting the frame, an adjustable connection between the axle and frame comprising a cap like member embracing an end of the axle, a brake drum carried by the wheel and surrounding said cap like member, an anchor plate carried by the cap like member within the brake drum, brake shoes pivotally supported by said anchor plate and adapted to swing into braking contact with said drum, and means to secure the cap like member to the frame for vertical but non-rotatable adjustment whereby the torque of braking will be transmitted to the frame.

CARL A. GUSTAFSON.

REFERENCES CITED

The following references are of record in the file of this patent:

UNITED STATES PATENTS

| Number | Name | Date |
|---|---|---|
| 1,661,815 | Britt | Mar. 6, 1928 |
| 2,116,825 | Crescent | May 10, 1938 |
| 2,190,091 | Wolfe | Feb. 13, 1940 |
| 2,275,302 | Magnuson | Mar. 3, 1942 |
| 2,422,462 | Ash | June 17, 1947 |